United States Patent [19]
Moore et al.

[11] Patent Number: 5,623,864
[45] Date of Patent: Apr. 29, 1997

[54] SINGLE CHAMBER BREWING DEVICE

[75] Inventors: Joseph F. Moore, Richmond, Va.;
Mark S. Kopaskie, Chagrin Falls, Ohio; Mark E. Cook, Stow, Ohio; Daniel J. Wanhainen, Newbury, Ohio; Craig C. Weidman, Wooster, Ohio

[73] Assignee: Healthometer, Inc., Bedford Heights, Ohio

[21] Appl. No.: 423,170

[22] Filed: Apr. 17, 1995

[51] Int. Cl.⁶ .................................................. A47J 37/00
[52] U.S. Cl. .............................. 99/280; 99/299; 426/433
[58] Field of Search ............................. 99/299, 279, 280, 99/281, 282, 283, 288, 293, 300, 304, 305, 306; 426/433

[56] References Cited

U.S. PATENT DOCUMENTS

| | | | |
|---|---|---|---|
| 3,423,209 | 1/1969 | Weber | 99/299 |
| 3,691,932 | 9/1972 | Martin | 99/281 |
| 4,805,523 | 2/1989 | Stuckey | 99/299 |
| 4,825,759 | 5/1989 | Grome et al. | |
| 5,267,506 | 12/1993 | Cai | 99/280 |

*Primary Examiner*—Robert W. Jenkins
*Attorney, Agent, or Firm*—Calfee Halter & Griswold

[57] ABSTRACT

A single chamber brewing device for brewing beverage has a single brewing chamber for receiving water and a brewing material such as tea, a thermally controlled heating element, and a thermally controlled valve for releasing brewed beverage from the brewing chamber into a container positionable underneath the brewing chamber.

22 Claims, 4 Drawing Sheets

SINGLE CHAMBER BREWING DEVICE

FIELD OF THE INVENTION

The present invention relates generally to automatic beverage brewing devices and, more particularly, to thermally controlled beverage brewing devices for brewing tea or the like.

BACKGROUND OF THE INVENTION

Automatic beverage brewing devices for brewing tea have heretofore been no more than automatic drip coffee makers in which tea is used instead of coffee. Water drawn from a water reservoir is heated and dripped over tea leaves held in a basket to produce tea in a carafe or receptacle. A controlled steeping period is required to extract a maximum amount of flavor from the tea leaves. Steeping requires that the tea leaves be submerged in a volume of water heated over a period of time to a temperature at which time the tea is ready to be served. Automatic brewing devices of the prior art which operate on the principle of dripping heated water through a basket do not provide a controlled temperature-dependent steeping period.

Automatic brewing devices also typically have separate reservoirs or chambers for water, brewing, and receiving the brewed beverage. Multiple chambers, combined with the requirement to transport liquid between the chambers, complicates the design and operation of such devices and increases costs and the likelihood of operational failure.

The present invention overcomes these and other disadvantages of prior art brewing devices for brewing tea or the like by a steeping process.

SUMMARY OF THE PRESENT INVENTION

The present invention provides an improved brewing device for brewing tea of the like by a steeping process in a single chamber which holds water and tea. In accordance with one aspect of the invention, a brewing device includes a brewing chamber for receiving a brewing material and liquid, a heat source for supplying heat to liquid in the brewing chamber, and a valve in an opening in the brewing chamber through which a brewed beverage is released from the brewing chamber.

In accordance with another aspect of the invention, a brewing device for preparing brewed beverage includes a brewing chamber for receiving a brewing liquid and a brewing material, a heat source attached to and in thermal communication with the brewing chamber, and a thermally responsive valve for controlling release of brewed beverage from the brewing chamber.

In accordance with another aspect of the invention, a brewing device for preparing brewed beverage by a steeping process in which a brewing material is held in water which is heated to a brewing or steeping temperature, includes a steeping chamber for receiving a brewing material and water, the steeping chamber having a thermal valve-controlled opening through which brewed beverage can exit the chamber, the thermal valve-controlled opening including a thermally responsive valve which opens in response to an increase in ambient heat, an electrically powered heat source in thermal communication with the steeping chamber, a container for receiving brewed beverage positionable underneath the brewing chamber and housing, and a cover for the steeping chamber.

These and other aspects of the invention will be apparent upon reading the following detailed description with reference to the annexed drawings.

DETAILED DESCRIPTION OF A PREFERRED EMBODIMENT

Figure 1:
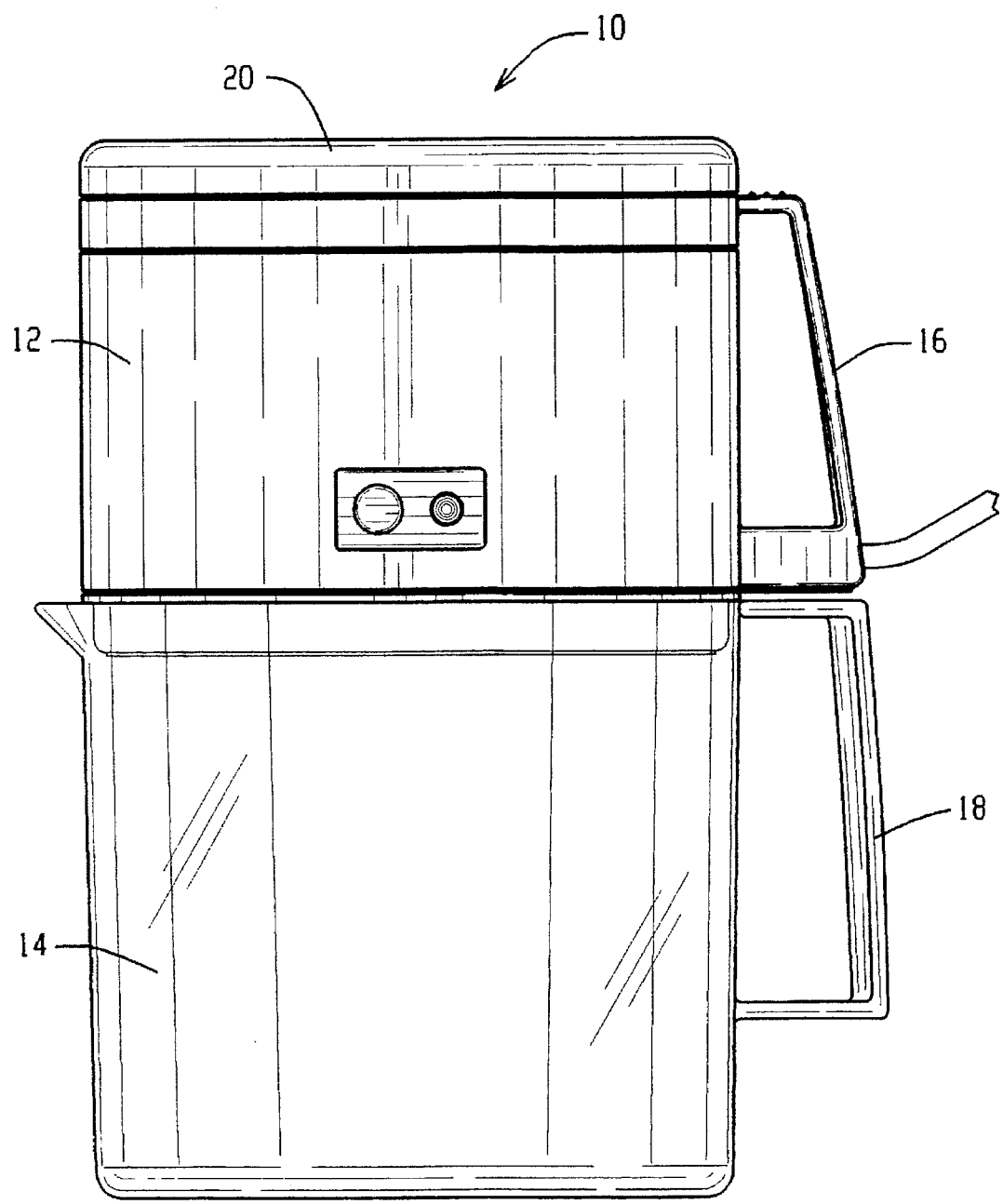
FIG. 1 is a side elevation of the brewing device of the present invention.

With reference to FIG. 1, there is illustrated a brewing device 10 which includes a brewing chamber 12 and a brewed beverage container 14. In this embodiment, brewing chamber 12 is dimensioned to be supported by and over a top opening in a brewed beverage container 14 which is in the form of a pitcher. Adjoining handles 16 and 18 facilitate manipulation of the brewing chamber 12 and container 14 in the integrated configuration-shown. Handle 18 provides a gripping point to facilitate pouring of container 14 in the manner of a pitcher. A lid 20 covers an top opening in brewing chamber 12. Upon removal of brewing chamber 12 from the top opening of container 14, lid 20 can be placed to cover the top opening of container 14 which is dimensioned substantially the same as the top opening of brewing chamber 12. Of course, the exterior and interior shapes and configurations of the brewing chamber 12 and container 14 may vary greatly such as, for example, cylindrical, bulbous or globe, or otherwise configured and contoured in any manner which provides sufficient interior cavities to contain liquid and to allow gravitational draining of brewed beverage from the brewing chamber 12 into container 14 as described below. Also, the container in particular can be formed to have close visual similarity to a pitcher or carafe, and may further be constructed with insulative walls and of suitable material such as porcelain to maintain the temperature of the brewed beverage.

Figure 2:
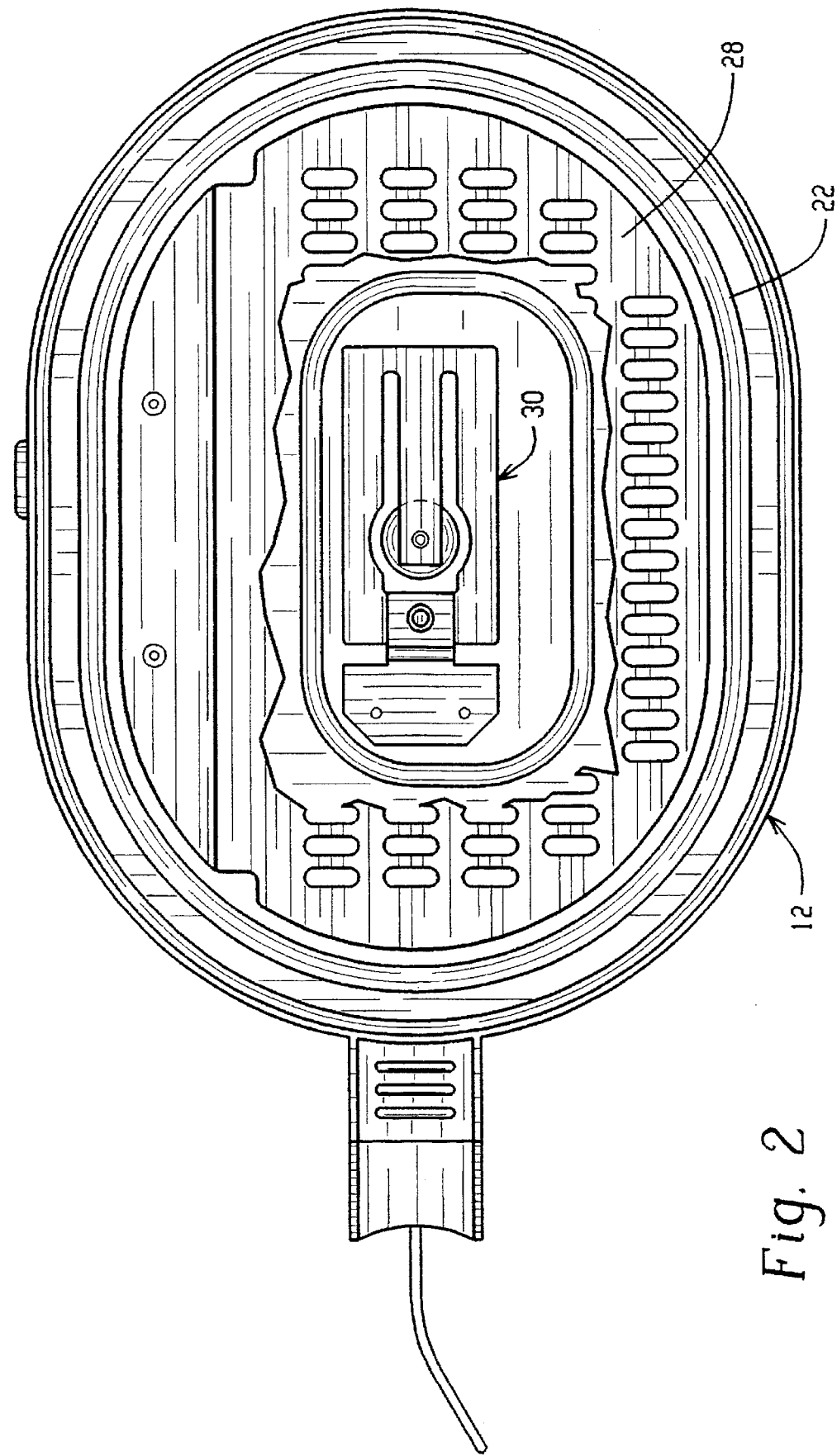
FIG. 2 is a top view of the brewing chamber portion, partially cut away, of the brewing device of the present invention.
Figure 3:
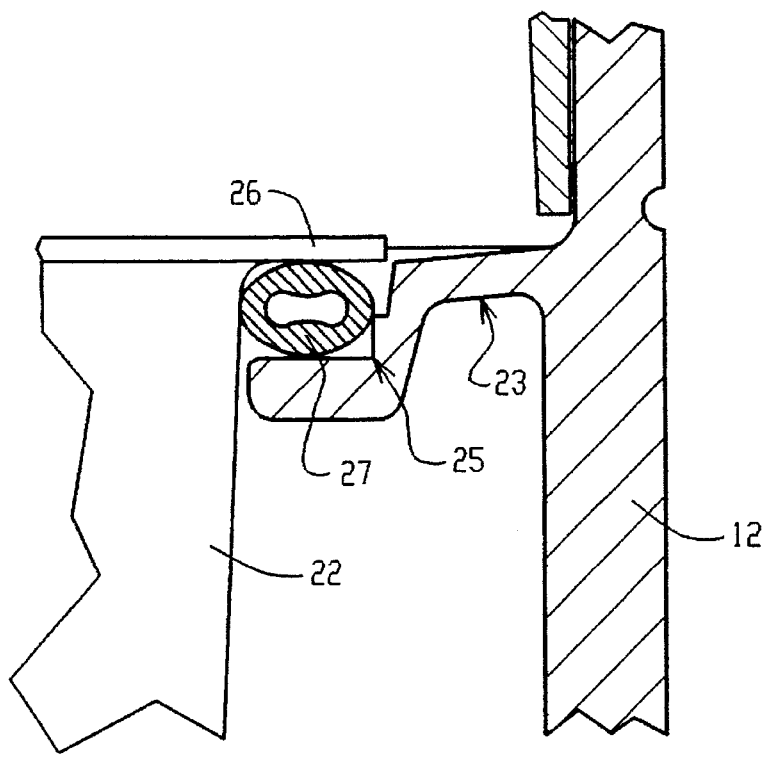
FIG. 3 is a cross-sectional view of a side wall portion of brewing chamber of brewing device of the present invention.

Referring to FIG. 2, the interior of brewing chamber 12, shown from above with cover 20 removed, includes a liner 22 which may be made of a metallic material and which fits within the walls of the brewing chamber. As shown in FIG. 3, the generally vertical walls of liner 22 are spaced inwardly from the interior surfaces of the generally vertical walls of the brewing chamber 12. This provides an insulative air gap between liner 22 and the walls of brewing chamber 12. A generally horizontal flange 26 at the top of liner 22 overlaps an interior flange 23 which extends radially inward from the brewing chamber walls and includes an annular step 25 for receiving and annular seal 27 upon which flange 26 rests. Liner 22 is thereby suspended within and not in contact with the vertical walls of brewing chamber 12, and the insulative air gap is sealed to prevent entry of moisture into the air gap or into contact with electrical components mounted on the exterior of liner 22 as described below. This arrangement also allows use of a metallic liner housed in a plastic brewing chamber even in the presence of a heat source and heated liquid within the liner without adverse effect on the surrounding plastic. The use of a metallic liner improves heat transfer efficiency from the heating element described below to liquid contained in the liner.

As further shown in FIG. 2, a perforated screen 28 is positioned horizontally near the bottom of liner 22 to support a brewing material such as tea in a bag or filter and allow brewed beverage to pass through to a valve located underneath the screen. Alternatively, a filter may be placed within liner 22 to rest upon screen 28 and receive tea or other brewing material therein. A center portion of screen 28 is cut away to reveal a thermally responsive bi-metal snap action valve 30, such as a bi-metal valve manufactured by Texas Instruments of Attelboro, Mass. A portion of the valve is mechanically moved by thermal expansion and contraction to open or occlude an opening 32 (shown in FIG. 4) in the bottom of the liner about which the valve is positioned. Valve 30 may alternatively be any of the type of thermally responsive bi-metal valves suitable for such applications, as are well known in the art, as for example the bi-metal valve described in U.S. Pat. No. 5,185,505 incorporated herein by reference. When liquid in liner 22 is heated to a temperature at which valve 30 is responsive to snap into an open position, the liquid is allowed to drain from liner 22 past valve 30 and through opening 32, thereby exiting the brewing chamber for entry into a brewed beverage receptacle such as container 14.

Figure 5:
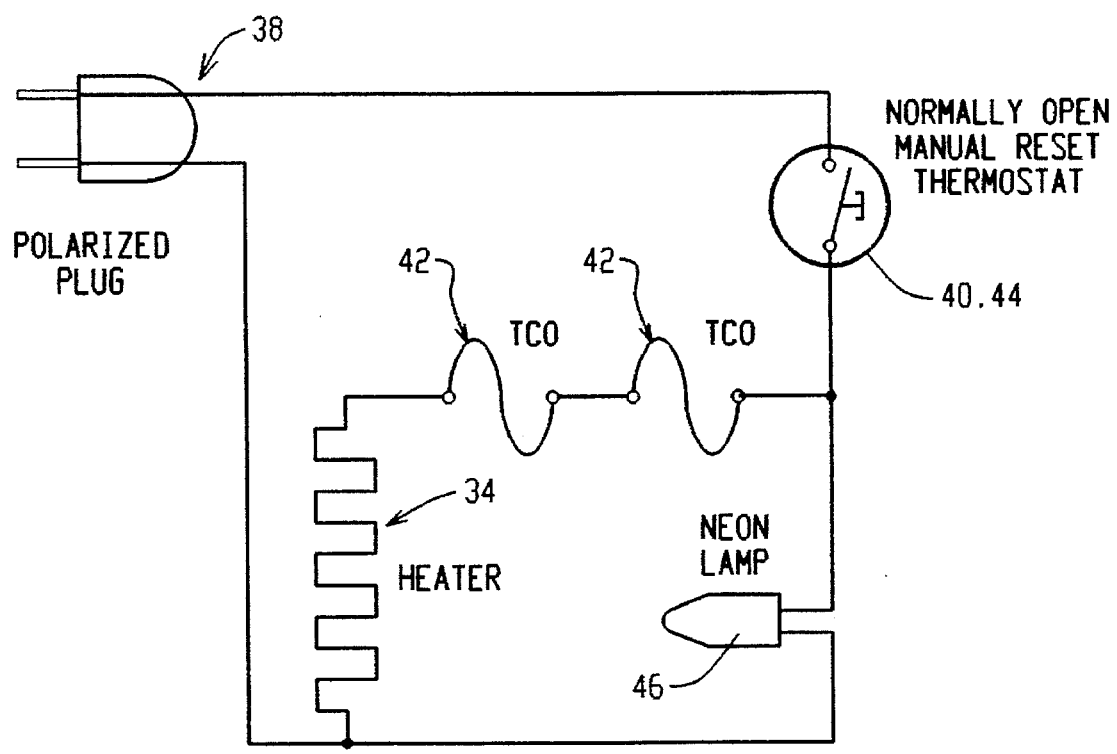
FIG. 5 is a schematic diagram of the power control circuit of the brewing device of the present invention.
Figure 4:
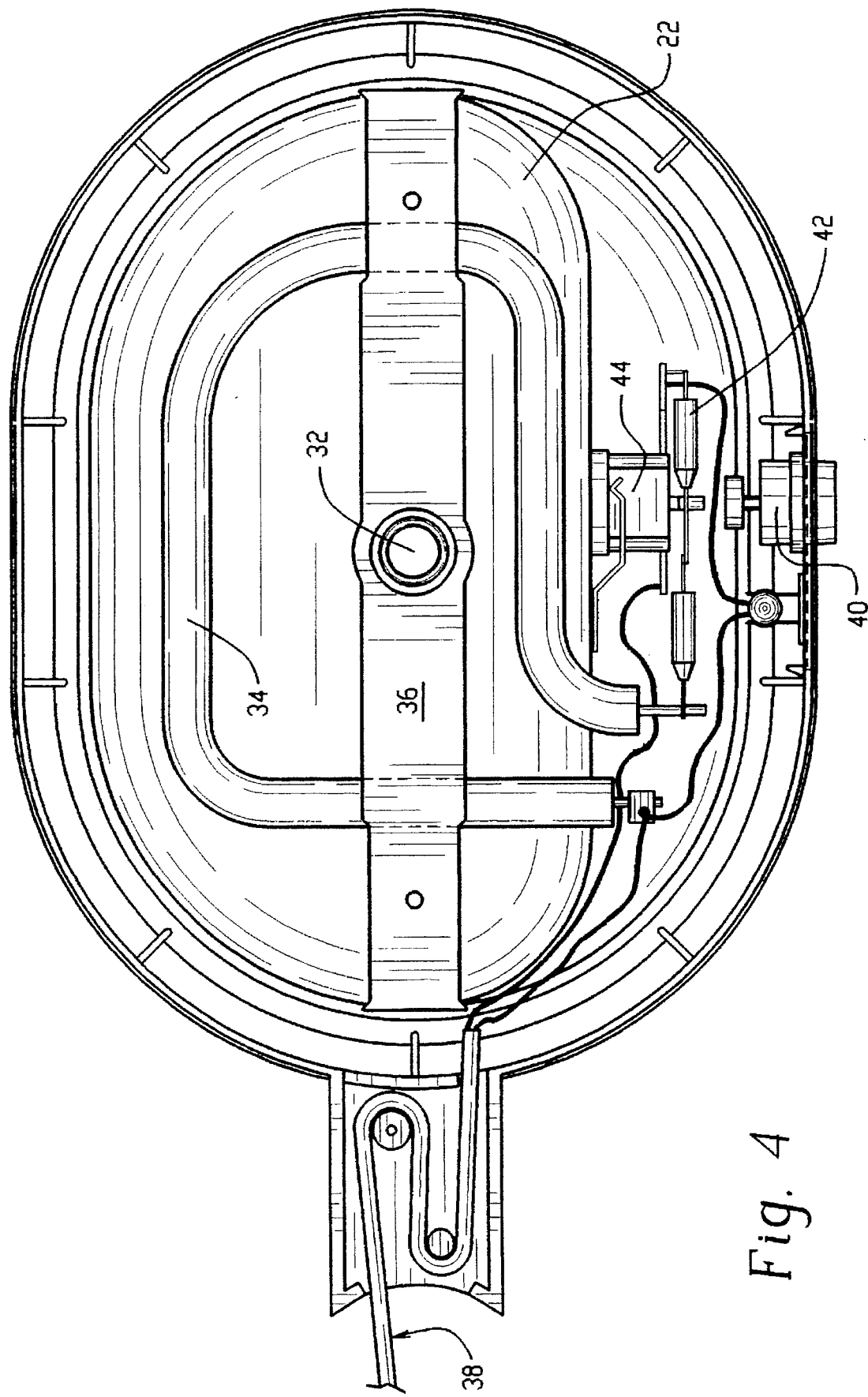
FIG. 4 is a bottom view of the brewing chamber of the brewing device of the present invention.

FIG. 4 illustrates the bottom of brewing chamber 12 (with a protective cover removed) where an electrically resistive heating element 34 is brazed or otherwise attached to the bottom surface of liner 22 to provide thermal energy to liner 22 and any liquid contained therein. As also schematically illustrated in FIG. 5, an AC power cord 38 is connected to heating element 34 through thermal limiting fuses 42 which limit the maximum temperature reachable by element 34. A normally open manually resettable thermostat 44 is in direct contact with a wall portion of liner 22. The thermostat 44 is set at an activation temperature at which it opens to cut off power to element 34 after valve 30 has opened but before all of the liquid has drained from liner 22. Thermostat switch 40 is mounted for access from the exterior of brewing chamber 12 adjacent an LED 46 which is illuminated while power is supplied to element 34.

Also shown in FIG. 4 is a conduit 48, such as a rubber tube, connected to opening 32 in liner 22 to direct liquid passing through opening 32 through bracket 36, and through a protective cover (not shown) which covers the bottom of the brewing chamber. conduit 48 provides a direct path from the brewing chamber 12 to the container 14 and prevents moisture from reaching the electrical components.

In accordance with the described construction of the brewing device, brewed beverage such as tea or iced tea can be easily prepared, contained and dispensed by placing the brewing chamber on top of container 14, placing a brewing material such as tea bags in liner 22 of the brewing chamber, filling the brewing chamber with water in a desired amount, covering the brewing chamber with cover 20, connecting power cord 38 to an AC power source and pressing switch 40 to activate thermostat 44 thus applying electricity to heating element 34. The heating of the water with the tea in the brewing chamber prior to the opening of valve 30 accomplishes the steeping action necessary to brew tea correctly for maximum flavor. When the valve opens, brewed tea automatically drains from the brewing chamber into the container and power to element 34 is automatically cut off by thermostat 44, which state is indicated by LED 46 in a darkened mode. The brewing chamber is then removed from the container and the tea is ready for dispensing directly from container 14. To brew and prepare iced tea, a quantity of ice is placed in the container 14 at the start of the brewing process and brewed tea is drained from the brewing chamber directly onto the ice.

Although the invention has been shown and described with respect to a particular embodiment, certain variations and modifications may become apparent to those skilled in the art. For example, the internal and/or external configurations of the brewing chamber and container may be altered to change the appearance of the device, different materials may be used to construct the device, and a different valve mechanism may be used to effect release of the brewed beverage from the brewing chamber at any desired temperature. All such modifications and variations are within the scope of the invention.

What is claimed is:

1. A brewing device for preparing and containing a brewed beverage, the device comprising, a brewing chamber adapted to receive a brewing material and liquid, the brewing chamber comprising a heat source for supplying heat to liquid in the brewing chamber, whereby the brewing material is brewed in the brewing chamber as the liquid is heated in the brewing chamber, and a valve disposed in an opening in the brewing chamber, the valve operative to release brewed beverage from the brewing chamber through the opening, and a brewed beverage container positionable to receive brewed beverage released from the brewing chamber.

2. The brewing device of claim 1 wherein the brewing chamber is supportable by the brewed beverage container.

3. The brewing device of claim 1 wherein the brewing chamber comprises a housing and metal casing within said housing.

4. The brewing device of claim 3 wherein the heat source is an electrical resistance element attached to the metal casing of the brewing chamber.

5. The brewing device of claim 4 further comprising switch means for controlling current to the electrical resistance element.

6. The brewing device of claim 4 further comprising a thermal limiting fuse in a circuit which supplies current to the electrical resistance element.

7. The brewing device of claim 4 further comprising a temperature limiting thermostat which controls the flow of current to the electrical resistance element.

8. The brewing device of claim 3 further comprising a moisture seal between the metal casing and the housing.

9. The brewing device of claim 3 wherein the housing further comprises a handle.

10. The brewing device of claim 1 wherein the valve is thermally responsive to heat generated by the heat source.

11. The brewing device of claim 1 wherein the valve is a bi-metal snap action valve.

12. The brewing device of claim 1 further comprising a cover over the valve adapted to support a brewing material within the brewing chamber.

13. The brewing device of claim 1 wherein a lower portion of the brewing chamber is contoured to engage an upper portion of the brewed beverage container.

14. The brewing device of claim 1 wherein the brewed beverage container further comprises a handle.

15. The brewing device of claim 1 wherein an opening in the brewing chamber is dimensioned substantially the same as an opening in the brewed beverage container.

16. The brewing device of claim 1 further comprising a cover dimensioned to cover an opening in the brewing chamber.

17. A brewing device for preparing brewed beverage comprising a brewing chamber for receiving a brewing liquid and a brewing material, a heat source attached to and in thermal communication with the brewing chamber, and a thermally responsive valve for controlling release of brewed beverage from the brewing chamber through an opening in the brewing chamber.

18. The brewing device of claim 17 wherein the brewing chamber is configured to be engagable with a brewed beverage receptacle.

19. The brewing device of claim 17 wherein the brewing chamber is comprised of a metallic material housed by a plastic material.

20. The brewing device of claim 17 wherein the heat source is an electrical resistance element attached to the metallic material, and further comprising a current controlling circuit connected to the resistance element and within the plastic housing.

21. A brewing device for brewing a beverage by a steeping process wherein a beverage making material is submerged in water which is heated in brewing chamber to a predetermined temperature, the brewing device comprising, a steeping chamber for receiving a brewing material and a liquid, said steeping chamber having a valve-controlled opening through which brewed beverage can exit the steeping chamber, the valve-controlled opening comprising a valve positioned about an opening in the steeping chamber, the valve operative to open in response to heat, an electrically powered heat source in thermal communication with the steeping chamber to heat liquid in the steeping chamber, and a cover for steeping chamber.

22. A brewing device for brewing a beverage by a steeping process in which a brewing material is submerged in liquid which is heated for a period time and to a temperature at which flavor from the brewing material is extracted into the liquid to produce a heated brewed beverage, the brewing device comprising a single chamber for receiving a quantity of a brewing material and a quantity of liquid, a controlled electric heat source in thermal communication with said chamber for heating the liquid in said brewing chamber to brew the brewing material in said chamber, and a thermally responsive valve in said chamber which opens to release brewed beverage from said container in response to heat generated by said heat source.

* * * * *